United States Patent [19]
Thirion

[11] 3,953,578
[45] Apr. 27, 1976

[54] METHOD FOR PURIFICATION OF INDUSTRIAL FLUE GASES
[75] Inventor: Pierre Thirion, Poisat, France
[73] Assignee: Oxysynthese, Paris, France
[22] Filed: Jan. 24, 1973
[21] Appl. No.: 326,289

[30] Foreign Application Priority Data
Feb. 4, 1972 France .............................. 72.03728

[52] U.S. Cl. ............................. 423/242; 423/522
[51] Int. Cl.² .......................................... C01B 17/00
[58] Field of Search .....................423/242–244, 522

[56] References Cited
UNITED STATES PATENTS
| | | | |
|---|---|---|---|
| 3,374,061 | 3/1968 | Topsoe et al. ...................... | 423/522 |
| 3,733,393 | 5/1973 | Couillaud et al. .............. | 423/242 X |

FOREIGN PATENTS OR APPLICATIONS
| | | | |
|---|---|---|---|
| 1,234,912 | 2/1967 | Germany ........................... | 423/242 |
| 670,966 | 1/1939 | Germany ........................... | 423/242 |
| 930,584 | 7/1963 | United Kingdom ................. | 423/242 |

Primary Examiner—Oscar R. Vertiz
Assistant Examiner—Gregory A. Heller
Attorney, Agent, or Firm—Browdy and Neimark

[57] ABSTRACT

Improved methods and apparatus for the purification of industrial flue gases, combustion products and gaseous effluents before their rejection to the atmosphere, said gases and effluents containing as impurities especially sulfur dioxide and also oxides of nitrogen, sulphuric fogs, dust and soot, said method comprising essentially the steps of: extracting the dust from the gaseous fluid to be purified; proceeding to a chemical purification phase of the gaseous fluid by establishing intimate contact between said fluid and an aqueous solution of hydrogen peroxide at a temperature lower than 80°C.; and carrying out a concentration phase by effecting a direct contact between the gases and the liquid of the gaseous effluents in the hot state, and said liquid being constituted by sulphuric acid formed during said purification phase. The chemical purification phase is carried out on the gaseous effluents when these latter are saturated with water and is effected at a temperature between 55° and 65°C.

13 Claims, 1 Drawing Figure

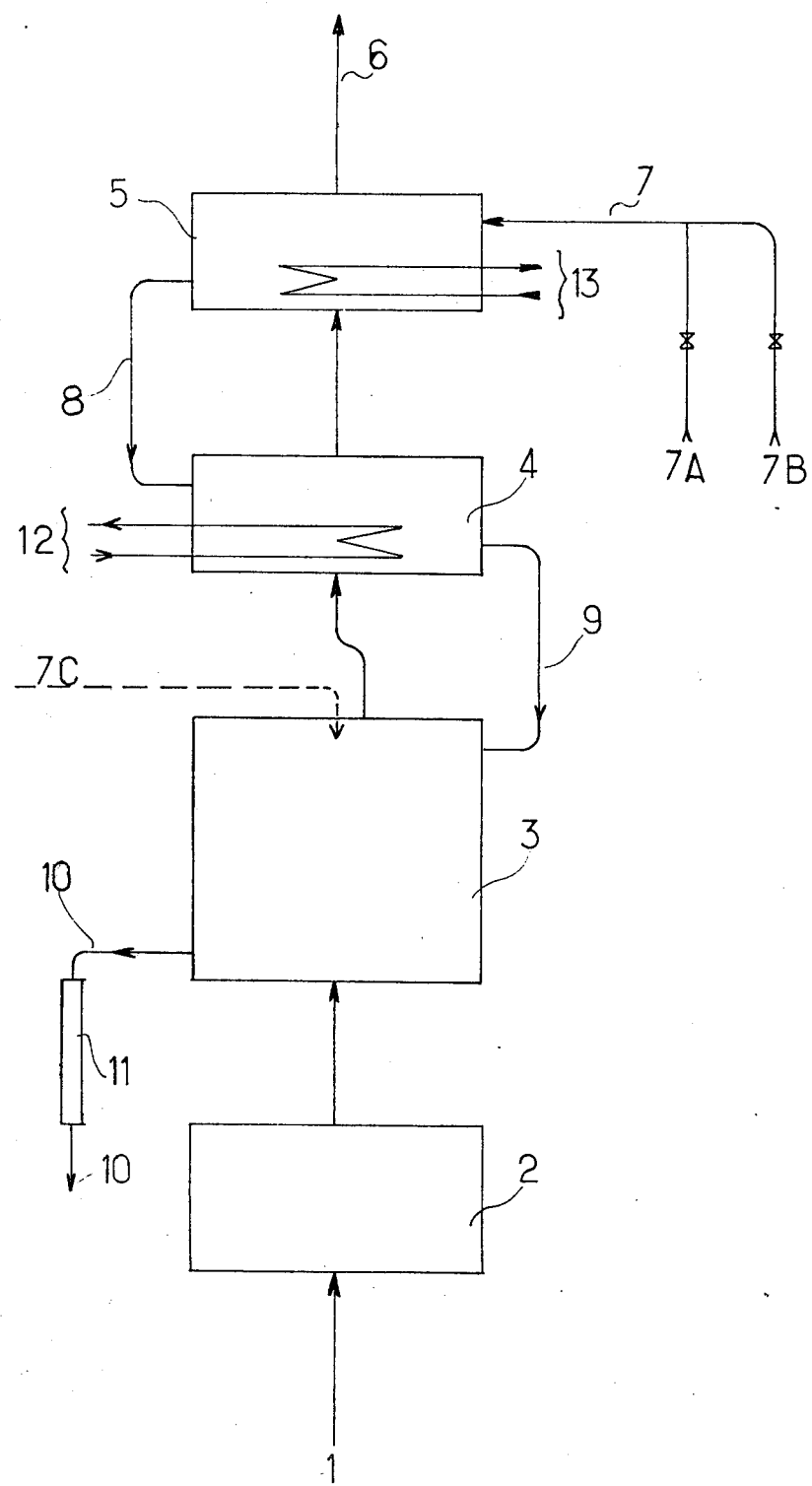

METHOD FOR PURIFICATION OF INDUSTRIAL FLUE GASES

The present invention relates to an improved method of purifying industrial gases, combustion products and gaseous elements containing in particular sulphur oxides as impurities, especially sulphurous anhydride, i.e. sulfur dioxide and possibly oxides of nitrogen, sulphuric fogs, dust and soot. The invention also concerns any installation which enables this method of purification to be carried into effect industrially.

Methods of purification utilizing persulphuric acids or hydrogen peroxide are already known, in which the purifying solution is put into intimate contact with the gas to be purified. The sulfur dioxide and the oxides of nitrogen are thereby respectively converted to sulphuric acid and nitric acid which are extracted with the purifying solution.

In accordance with one of these methods, the process is applied in at least two stages consisting of a first de-dusting stage followed by a second chemical purification stage for the combustion gases, in which intimate contact is produced between the smoke or gas with a solution containing hydrogen peroxide. According to an alternative form of this method, the stages of de-dusting and chemical purification are followed by a liquid-gas separation stage by de-bubbling. In this method, the chemical oxidation phase is carried out at temperatures comprised between 80° and 150°C.

When it is a question of equipping a large industrial boiler with a flue-gas purification station, difficulties of an economic nature may preclude certain solutions which are permitted and tested on a small scale. This is the case for the treatment and disposal of the flue gases at high temperature. This disposal at high temperature (80° to 140°C.) also implies at least an equal temperature of the chemical purifier fed with $H_2O_2$.

In the first place, the application of this method necessitates almost complete elimination of the soot, which is an active decomposition catalyst for $H_2O_2$, especially at high temperature. Now, in practice, a de-dusting operation never gives a perfect result. In a pilot installation, it is easy to obtain the desired level of de-dusting for two reasons. On the one hand, the economic aspect of the operation (capital cost and pressure losses) is negligible, which is no longer the case as soon as it is necessary to proceed to an industrial extrapolation of 1,000 or 10,000 times. On the other hand, the periods of continuous working on a pilot installation rarely exceed a few days or a few weeks, while industrial operation periods last for months continuously. As fouling by soot is cumulative, it follows that in an industrial installation a still higher level of purification (of the order of 10 times) must be aimed at.

Thus, in a given pilot installation constructed so as to carry the known method into effect, the calculated efficiency on the $H_2O_2$ consumed is 91% for about 30 hours of working. If, on this same installation (comprising the same de-duster) the test of continuous working for a long period is continued, it is observed that the efficiency continually decreases. After 12 days working, it is only 58%.

It has also been found that the utilization of $H_2O_2$ at high temperatures results in an undesirable phenomenon, namely that of an increase in the vapour tension of $H_2O_2$ by the presence of sulphuric acid in the aqueous solution; this reaches a maximum at 70% of sulphuric acid. A reaction in the gaseous phase is thus superimposed on the normal reaction in the liquid phase. This reaction in the gaseous phase immediately results in the formation of a sulphuric aerosol which it is essential to recover for obvious reasons (efficiency, corrosion, pollution of the surroundings). In this case also, in a small installation, the recovery of this aerosol does not present economic problems, but this is no longer the case for a thermal power station of 100 megawatts and more.

Thus, the absorption of the $SO_2$ by $H_2O_2$ on hot industrial flue gases cannot be undertaken without disadvantages on very large installations. The treatment of these hot flue gases involves the expenditure of capital cost and operation such that it is more advantageous to treat the cooled gases and lose the advantage of the rejection of hot flue gases.

Before proposing an improved method, it would appear desirable to make a few general remarks.

Hydrogen peroxide and the peracids have a relatively high cost price and thus, in order that a method of purification which utilizes them may be contemplated on an industrial scale, it is necessary to reduce to the minimum the losses of oxidizing reactant by trying to obtain a good oxidation efficiency and complete exhaustion of the hydrogen peroxide contained in the extracted acid. Finally, there must be obtained an acid which can be directly disposed of commercially, and which is therefore sufficiently concentrated and pure.

The gaseous chemical effluents containing sulfur dioxide such as those supplied by the manufacture of sulphuric acid by contact, reconcentration of residual acids, residuary gases from the roasting of ores, are quite special cases in respect of their content of water or dust, and represent a very small proportion of the mass of sulphurous anhydride ejected to atmosphere by industry in general.

On the other hand, the combustion gases of the solid or liquid fuels of thermal power stations represent a much more considerable part of the whole of the pollution by sulphur oxides and nitrogen oxides to which must be added black smoke gases. These combustion effluents, in addition to their considerable rates of flow, offer the maximum amount of technical difficulty when it is desired to purify them by contact with hydrogen peroxide.

A simple technique, tested on clean and relatively dry gas will not be adequate to resolve effectively the main problem of boiler flue gases. In fact, soot is a powerful decomposition catalyst of peroxides, especially when hot, and if it is not possible to eliminate the soot completely, its presence, even in the state of traces, results in a decomposition of the hydrogen peroxide which inevitably causes a substantial reduction in the efficiency of purification.

The methods of adsorption of $SO_2$ at present known in the same technical field are not suited to industrial exploitation. These methods are directed to obtaining concentrated acids by proposing unsuitable industrial means such as the utilization of dry gases or gases previously dried by cooling and heating; absorption at excessively high temperatures; concentration of acid by re-cycling and compensation for the phenomenon of superheating by considerable re-cycling of liquid.

It has been found that the treatment of boiler flue gases or of any gaseous effluent containing oxides of sulphur and oxides of nitrogen, known as the gaseous fluid to be purified, may be correctly and effectively carried out by operating in three successive and perfectly separate stages: de-dusting, concentration of sulphuric acid and absorption of sulfur dioxide or chemical purification, considering the direction of the flue gases.

According to the present invention, the chemical purification stage of the flue gases in which intimate contact is effected between the flue gases or industrial gases and a solution containing hydrogen peroxide is carried into effect at a temperature below 80°C. the preferred temperature zone being between 55° and 65°C. It has been found that the absorption of the sulfur dioxide by the hydrogen peroxide is facilitated at these temperatures.

According to the invention, a direct contact phase of the gaseous fluid to be purified and the liquid is provided in counterflow with the flue gases or the like preceding the chemical purification phase, the liquid being sulphuric acid formed during the chemical purification phase. According to a preferred alternative form, the direct contact of the gaseous fluid and the liquid in the concentrator takes place between the de-dusting phase and the chemical purification phase, following the direction of circulation of the flue gases.

The gas-liquid contact is doubly effective. This contact permits re-concentration of the dilute acid obtained from the chemical purifier, by using the sensible heat of the hot flue gases supplied from the thermal power station. On the other hand, this gas-liquid contact permits the flue gases to be cooled, or in other words placed in better conditions for the absorption of the sulfur dioxide by the hydrogen peroxide.

This gas-liquid contact is effected in a column or concentrator. It is preferable to install this concentrator following the de-dusting stage, in order to prevent fouling of the column and the sulphuric acid by dust, but also in order to perfect the said de-dusting.

In the concentration phase, the hot flue gases or the like are introduced into the foot of the concentrator which is traversed in counterflow and in direct contact with the liquids. The dilute sulphuric acid delivered by the absorber is introduced into the head of this concentrator and it flows out from the foot of the concentrator in a relatively pure concentrated form.

The purification phase is initiated in a purifier or absorber. Such purifier is composed of two or more successive stages, and it is supplied at the head by a cold dilute solution of hydrogen peroxide. At the foot of this absorber-purifier, the sulphuric acid produced in the form of a dilute solution is almost wholly free from hydrogen peroxide, this having been entirely consumed by the sulfur dioxide. The number of stages of the absorber only depends on:

a. The effectiveness of these stages;
b. on the degree of purification desired;
c. and finally on the loss of hydrogen peroxide accepted in the drainage at the foot of the absorber.

The flue gases delivered to the output of the purification installation are saturated with water. They do not contain either sulphuric aerosol or black smoke, and are completely freed from sulfur dioxide. Before they are discharged to the atmosphere, they may be heated if so desired by an independent supply of heat or by the latent heat supplied by the primary flue gases.

It has been found that the absorption of sulfur dioxide by an aqueous solution of hydrogen peroxide is effected with a maximum effectiveness and a quantitative efficiency in the cold state and in the presence of the smallest possible amount of sulphuric acid. In the presence of an increasing concentration of acid, this effectiveness decreases, but the efficiency remains quantitative. This fact precludes the re-cycling of sulphuric acid.

In the hot state (for example from 50° to 70°C. on dry gas) the effectiveness would appear to be highest, but two particular features are observed, according to which the quantity of acid obtained is no longer in accordance with theory, and there is a fall in efficiency; and analysis of the effluent indicates the presence of sulphuric aerosol which increases as the temperature becomes higher, which explains the apparent fall in the efficiency.

This represents a serious handicap for the treatment of hot and moist flue gases of thermal power stations since the cooling with condensation of water of these flue gases is practically a technical impossibility. This refrigeration would necessitate a huge condenser subject to corrosion, and an exorbitant consumption of water, or alternatively, if a contact is chosen, the transfer of the pollutents into the cooling water.

Now, according to the present invention, there has been found an unexpected method of utilization, in which by previously humidifying the gas to saturation at the chemical treatment purification temperature, the formation of an aerosol is prevented and there is again obtained a quantitative efficiency in sulphuric acid. There is thus obtained a dew point higher than that of the primary gas.

This condition has only been brought into evidence by working on industrial gases on an industrial scale in apparatus which is sufficiently large to ensure that the heat exchanges between the gaseous and purifying liquid phases (dilute $H_2O_2$) are not falsified by external losses of heat. An installation which can treat several multiples of 10 $Nm^3$ per hour and suitably heat-insulated is necessary as a minimum to reveal the conditions necessary for an industrial scale and which were not observed in the laboratory.

It has been made clear that the fact that any transfer of energy from the liquid phase towards the gaseous phase gives rise to the sulphuric aerosol and causes a consequent fall in the efficiency in sulphuric acid obtained with respect to the $H_2O_2$ consumed. To this transfer there corresponds an evaporation of water, and in the practical cases of the hot treatment of a gas which is too dry or heating of the liquid phase as a result of the oxidation reactions of which it is the seat, there is produced, in particular:

$SO_2$ liquid + $H_2O_2$ liquid → $H_2SO_4$ dilute and
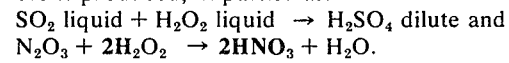

In practice, it is both important and essential to treat gases saturated with water and to maintain the temperature of the liquid phase very close to this saturation point by a partial and controlled cooling.

It has further been found that the recovery of the aerosol only compensates very partially for the loss of sulphuric acid. There is thus added a loss of active oxygen to the loss of acid by being carried away.

This sulphuric aerosol is produced in the gaseous phase by the action of sulphurous anhydride on hydrogen peroxide vapour. It has been found that hydrogen peroxide has a non-negligible vapour tension at above 60°C., and that this is greatly increased by the presence of sulphuric acid, especially at concentrations between 30 and 90% by weight, with a maximum at 70%. In tion with water of the gas which is to be purified by washing with an aqueous solution of $H_2O_2$.

For this purpose, air is introduced into the foot of the absorber heated by propane burners and into which $SO_2$ has been added. This air is at 60°C.; it contains 18 to 20 g/Nm³ of water vapour (dew point about 22°C.) and 1200 vpm of $SO_2$; its flow-rate of 130 Nm³/.hr (the internal diameter of the absorber is 230 mm.).

There is introduced through the pipe 7 a flow of 10 mols per hour of $H_2O_2$, (or 340 grams per hour at 100%) and water. The flow-rate of water is first regulated so as to fill this absorption stage sufficiently and then so as to compensate the losses by evaporation carried away by the hot and relatively dry gas. After starting-up and working for 3 hours under stable conditions, analyses are made on the gases and the liquid produced by the purifier and supplied through the conduit 8.

$SO_2$ purifier inlet: 1200 vpm;
$SO_2$ purifier outlet: 175 to 185 vpm;
Purification factor:

$$\frac{1200 - 180}{1200} \times 100 = \frac{102000}{1200} = 85\%$$

In addition to the remaining $SO_2$, this gas contains 350 mg/Nm³ of sulphuric aerosol counted in 100% $H_2SO_4$. This aerosol thus represents 0.350 g. × 130 = 55 g. $H_2SO_4$ or 0.56 mol per hour.

The liquid supplied by the purifier represents a flow-rate of 880 grams per hour and contains 539 g. of AS, or 5.49 mols per hour and 87 g. of $H_2O_2$ or 2.38 mols per hour (AS represents sulphuric acid).

The efficiency in acid obtained is thus:

$$\frac{5.49}{10 - 2.38} \times 100 = \frac{549}{7.62} = 72\%.$$

EXAMPLE 2

The test described in Example 1 is continued, but there is added to the primary gas a quantity of live steam supplied from a steam distribution system, so as to saturate the gas at a temperature of 58° to 60°C. the same as that of the purifier. The flow of dry gas remains the same as before (130 Nm²/hr) and this saturation necessitates the introduction of the order of 125 grams of water per Nm³ in addition to the 18 to 20 grams contained before saturation. After about 3 hours stable working, analyses and a balance sheet are carried out as in the previous Example. There are obtained:

$SO_2$ purifier inlet: 1200 vpm;
$SO_2$ purifier outlet: 105 to 113 vpm;
Purification factor:

$$\frac{1200 - 109}{1200} \times 100 = \frac{109100}{1200} = 91\%.$$

In addition to the $SO_2$, the gas contains 30 mg/Nm³ of aerosol expressed in 100% $H_2SO_4$, which corresponds to 4 g./hr or 0.04 mol/hr.

The liquid supplied by the evaporator represents a flow-rate of 5200 g/hr and contains 630 g. of AS, or 6.42 mols per hour, and 119.6 grams of $H_2O_2$, or 5.52 mols per hour.

The efficiency in acid obtained is therefore $$\frac{6.42}{10 - 3.52} \times 100 = \frac{642}{6.48} = 99\%.$$

There is therefore practically no more loss of active oxygen and the formation of aerosol has become a minimum. In addition, the effectiveness of absorption of the $SO_2$ is higher in this case.

EXAMPLE 3

In the example given below, it is proposed to treat the flue gases of a steam power station in a pilot installation according to the annexed diagram and comprising two chemical purifiers. The results obtained are given below. In this example, no re-cycling of acid is provided.

The flue gases to be treated are available at the intake of the evacuation chimney at 135°–140°C. They contain about 220 mg/m³ of smoky charcoal and dust, and their water vapour tension is 90 mm.Hg (dew point about 50°). After condensation of the steam, the composition of these flue gases is as follows:

| | | | |
|---|---|---|---|
| $N_2$ | 81.6% vol/vol | $SO_2$ | 1300 to 1390 vpm |
| $O_2$ | 1.7% vol/vol | NOx | Traces |
| $CO_2$—CO | 14.0% vol/vol | Residual water 2.4% | |
| $SO_3$ | Traces. | | |

The installation is operated in accordance with the following principles:

1. Constant flow-rate of flue gases: 150 Nm³/hr;
2. Total purification of the $SO_2$ contained in the flue gases while preventing however any excess of $H_2O_2$ which, being lost, would adversely affect the efficiency. The condition necessary for the control of working in order to avoid this excess is to leave measurable traces of $SO_2$ in the flue gases - in this case less than 30 vpm (volumes per million);
3. Temperature of the outlet flue gases maintained in the vicinity of dew point. Due to the evaporation of water carried away into the concentrator 3, this dew point amounts to about 50° to 58°C. A temperature of 60° to 62°C. is maintained at the outlet of the concentrator by varying the flow-rate of water to be evaporated by this latter. For that purpose, the water added at 7 as a dilution of the $H_2O_2$ is maintained at a constant flow of 3.5 liters per hour. An additional amount of water at a variable flow-rate, 1 to 1.5 liters per hour, is introduced at 7c and is sprayed into the head of the concentrator.

In addition, in order to avoid any superheating of the liquid phase of the absorbers, it is proposed to eliminate the reaction heat by supplying the cooler 13 of the absorber 5 with a small flow of water. In fact, this absorber normally carries out of the order of 90% of the purification, and the work of the absorber 4 is practically negligible, since it only serves to exhaust the residual $H_2O_2$ which has not reacted at 5.

The flow-rate of cold water to be admitted at 13 is of the order of 15 to 20 liters per hour of water at 16°. This flow rate is given by the following calculations:

Total $SO_2$ to be absorbed = 9.2 mols/hr at 95 Kcal/mol or 880 Kcal per hour to be dissipated.

Cooling capacity of the water (60°C − 16°C.) × 1 cal/°C. = 44 cal/kg.

Flow-rate of water necessary: 880/44 = 20 kg/hr.

The installation is started-up and after 15 hours, all the temperatures, pressures and flow-rates being peritself, this aerosol is a considerable nuisance which, in previous known methods, required additional apparatus for eliminating the aerosol. In the method proposed, not only is there no formation of aerosol but if the gases or primary flue gases contain such, as is generally the case, at the outlet of the chemical purifier, a definite reduction of the percentage of aerosol is observed.

The addition of sulphuric acid to the aqueous solution of hydrogen peroxide reduces their water vapour tension but increases that of the hydrogen peroxide. In consequence, this precludes any possibility of washing a large flow of gas above its dew point by increasing the concentration of sulphuric acid in the liquid phase, for example by re-cycling the sulphuric acid produced by the chemical purifier. This fact shows the lack of advantage of methods based either on purification at high temperature or reduction of the water vapour tension of the liquid phase by the addition of sulphuric acid, either directly or by re-cycling.

It is known that one of the greatest difficulties of the purification of industrial smoke and flue gases by hydrogen peroxide arises from the presence of dust and soot, and that a prior de-dusting is essential. However, an industrial dust extractor is never a complete barrier against the sub-micronic particles of which soot is composed. This soot is a good decomposition catalyst of hydrogen peroxide, especially in the hot state. The advantage of the maintenance of a temperature as low as possible in chemical purification containing hydrogen peroxide is all the more apparent.

The liquid supplied by the purifier and flowing out from the foot of this purifier has a concentration in sulphuric acid which depends mainly on the content of sulfur dioxide in the flue gases or smoke to be treated. This concentration with hot and humid gases or smoke does not exceed 20 to 25% of sulphuric acid as a maximum. This sulphuric liquid is then admitted to the head of a counter-flow concentrator and in direct contact with the hot flue gases. The gas gives up its heat, an evaporation of water takes place, and the liquid becomes concentrated and gradually heats up from the top to the bottom of the apparatus.

For a well-dimensioned concentrator, it is possible to obtain at the foot an acid having a concentration in conformity or very nearly so with the theory of the equilibriums sulphuric acid-water vapour-water-temperature. For example, in the case of fuel flue gases having a water vapour tension of 90 mm. Hg at 140°C., it is possible to obtain an acid titrating 80%. In previous methods, it was frequently necessary to reinforce the strength of the acid.

On the other hand, taking the circuit of the smoke or flue gases, these must be admitted to the chemical purification when cooled and saturated with water.

In the actual case of the purification of gases containing $SO_2$ by hydrogen peroxide according to the invention, the acid concentration phase is concomitant with the humidification of the smoke or flue gases. The acid concentrator plays the additional part of a cooler and humidifier for the smoke or flue gases. This concentrator-humidifier and cooler thus supplies at its foot a concentrated and commercially salable acid while at its head it delivers smoke gases which are ready for purification by hydrogen peroxide.

The quantities of water to be evaporated are such that the acid from the foot of the concentrator is at the desired concentration and that the smoke or flue gases from the head are saturated with water. As gaseous effluents in general and flue gases in particular have characteristics which vary with time, such as flow-rate, latent heat, content of $SO_2$, which are unfavorable to the regular operation of the concentrator-saturator, it is desirable to re-establish the working equilibrium by regulating for example the flow-rate of dilution water of the hydrogen peroxide at the head of the purification-absorption phase. For this reason, it is only necessary to keep the temperature of the concentrator constant and very close to the dew point by admitting more or less considerable quantities of water in order to obtain an acid with uniform concentration. In an alternative method which is more flexible, and permits a more uniform operation of the absorber, the head of the absorber-purifier can be supplied with a constant flow-rate of dilution water while an additional quantity of water is added by spraying on the concentrator-saturator at a variable flow-rate controlled in dependence on the temperature at the head of the concentrator.

In the installation shown in the accompanying drawing by way of a non-limitative example in order to facilitate comprehension of the invention, the primary smoke gases are introduced through the conduit 1 into the dust extractor 2. They are then introduced while hot into the foot of the concentrator 3, traversed in counter-flow and in direct contact with the liquids. The dilute sulphuric acid produced by the chemical purifier-absorber 4 is introduced into the head of the concentrator 3 through the conduit 9 and the concentrated and relatively pure acid is extracted from the foot of the concentrator 3 by the conduit 10; it is cooled by the cooler 11.

The flue gases, cooled and saturated with water are then introduced into the foot of the purifier-absorber 4. The purifier-absorber is composed of two or more successive stages 4 and 5, the first absorber 5 being supplied at its head by a dilute aqueous solution of $H_2O_2$; the $H_2O_2$ solution is led over the conduit 7A and the water by the conduit 7B. This solution passes in cascade through the absorbers 5 and 4 in counter-flow (conduits 7, 8 and 9) and in direct contact with the smoke gases. At the foot of the absorber 4, the production of acid flows out through conduit 9 in the form of a dilute solution which is completely or almost completely exhausted of its $H_2O_2$. This solution is sent to the concentrator through the conduit 9.

The number of stages of the absorber-chemical purifier only depends on the effectiveness of these stages, on the degree of purification which it is desired to obtain, and finally on the loss of $H_2O_2$ which it is permissible to sacrifice in the drainage from the foot of the absorber. The flue gases are delivered to the outlet of the installation through the conduit 6. The spraying of water at 7c at the head of the concentrator 3 and the coolers 12 and 13 permit the treatment of gases saturated with water and the maintenance of the liquid phase at a temperature very close to this saturation point, by partial cooling.

Non-limitative examples are given below to illustrate the manner in which the invention is carried into effect.

EXAMPLE 1

In a very simplified installation consisting of a single heat-insulated absorber such as the absorber 5 of the annexed diagram, in which the cooler 13 has been eliminated, it is proposed to demonstrate by the two examples which follow, the importance of the saturafectly steady, arrangements are made for carrying out a working weight balance spread over 35 hours.

During this period, the following indications are read:

|  | T° flue-gases °C. | T° liquid °C. | Pressure in mmWG |
|---|---|---|---|
| Inlet concentrator 3 | 135 | 128 | 165 |
| Outlet concentrator 3 | 61 | 60 | 93 |
| Outlet purifier 4 | 59 | 58 | 47 |
| Outlet installation 6 | 58 |  | 0–2 |
| Average flow-rate of $H_2O_2$ |  | 610–620 ml/hr |  |
| Average flow of water introduced to chemical purification |  | 4.8 liters/hr |  |
| Liquid effluent flow-rate in chemical purification containing 159 g/l sulphuric acid and 1.1 g/l of $H_2O_2$ |  | 5.9 liters/hr |  |
| $SO_2$ inlet average |  | 1350 vpm |  |
| $SO_2$ outlet average |  | 10 vpm |  |
| Sulphuric aerosol inlet |  | 100–110 mg/m³ $H_2SO_4$ |  |
| Sulphuric aerosol outlet |  | 55 mg/m³ $H_2SO_4$ |  |

The balance for 35 hours operation is as follows:

Purification factor in $SO_2$: $\frac{100 \times 1350 - 10 \text{ vpm}}{1350} = 99.2\%$ Consumption of $H_2O_2$: 25,220 g at 42.3% by weight, or 10,660 g at 100% or 313.5 mols.
Sulphuric acid obtained:
  Concentration  78.2%
  Soot content  0.13 gram/liter
  Nitric acid  <300 mg/liter (not dosable).

There are obtained 40,120 grams of sulphuric acid, or 31,346 grams at 100% or 419.6 mols $H_2SO_4$ recovered from the aerosol: 0.05 g × 150 m³/hr × 35 h = 263 grams or 2.68 mols, $H_2SO_4$ recovered from $SO_2$: 319.6 − 2.6 = 317.0 mols.

Efficiency in $H_2SO_4$ obtained with respect to the $H_2O_2$ consumed:

Overall efficiency: $100 \times \frac{319.6}{313.5} = 102.0\%$

Oxidation efficiency of $SO_2$: $100 \times \frac{317.0}{313.5} = 101.1\%$

It may be assumed that this efficiency, higher than the stoichiometric value would fairly probably be due to stray oxidation by $NO_2$ and $O_2$.

EXAMPLE 4

It is proposed to treat the flue gases of a thermal power station supplied with solid sulphurous fuel. The flue gases delivered have a composition very close to that of the previous example with the exception of the $SO_2$, which reaches 4000 to 4200 vpm. Their temperature is 140° – 150°C. and after a first de-dusting by cyclone, they still contain 200 mg/Nm³ of dust and soot. Their humid dew point is from 48° to 50°C.

150 Nm³ per hour are treated in a pilot installation in accordance with the accompanying diagram, and comprise three chemical purifiers according to the principles adopted for Example 3. The dew point at the outlet of the concentrator is about 60°C. and the coolers of the second and third absorbers only are supplied with water at 16°C., respectively at 10 to 12 liters per hour for the second and 40 to 45 liters per hour for the head absorber.

The installation is put into operation, and after about 20 hours, the whole of the temperatures, pressures and flow-rates being quite stable, arrangements are made to carry out a weight balance spread over 12 hours.

During this operation, the following indications are read:

|  | T° flue-gases °C. | T° liquid °C. | Pressure in mmWG |
|---|---|---|---|
| Concentrator inlet | 140 | 127 | 219 |
| Concentrator outlet | 60 | 60 | 137 |
| First purifier outlet | 59 | 58 | 93 |
| Second purifier outlet | 58 | 57 | 46 |
| Installation outlet | 57 | 56 | 0–2 |
| Average flow-rate of $H_2O_2$ 43% by weight (7A') |  | 1900 ml/hr |  |
| Total flow-rate of water introduced (7B + 7C) |  | 4.9 liters/hr |  |
| Liquid effluent flow-rate from first purifier (9) Containing 525 g. per liter of AS and 0.4 grams per liter of $H_2O_2$ |  | 7.7 liters/hr |  |
| $SO_2$ inlet average |  | 4130 vpm |  |
| $SO_2$ outlet average |  | 80 vpm |  |
| Sulphuric aerosol inlet |  | 115–120 mg/m³ $H_2SO_4$ |  |
| Sulphuric aerosol outlet |  | 60 mg/m³ $H_2SO_4$ |  |

The balance for 12 hours working is as follows:

Purification factor in $SO_2$: $\frac{100 \times 4130 - 80 \text{ vpm}}{4130} = 98\%$ Consumption of $H_2O_2$: 26,600 g at 43% = 11,430 g at 100% or 336 mols.
Sulphuric acid obtained:
  Concentration  77.6%
  Soot content  0.12 g/liter
  Nitric acid  Not measurable There are obtained 42,250 grams of sulphuric acid or 32.750 grams at 100%, or 334.3 mols.

Sulphuric acid recovered from aerosol: 0.057 × 150 m³/hr × 12 hr = 103 grams or 1.05 mol.

Sulphuric acid recovered from $SO_2$: 334.3 − 1.05 = 333.25 mols.

Efficiency in sulphuric acid obtained with respect to $H_2O_2$ consumed:

Overall efficiency: $100 \times \frac{334.3}{336} = 99.5\%$

Oxidation efficiency of $SO_2$: $100 \times \frac{333.25}{336} = 98.2\%$

It is observed that the concentration of sulphuric acid supplied from the purifiers is relatively high, reaching 40% at the foot of the last purifier, and this has the effect of reducing the absorption capacity of the purifiers. This phenomenon, added to the considerable heat of reaction, necessitates in the case of high concentrations of $SO_2$, the utilization of 3 to 4 purifiers as in the above Example.

When comparing the results of the previous tests with those of known methods, certain important advantages are very clearly apparent.

There is observed an increase in the oxidation efficiency of the $SO_2$, in the vicinity of 100% instead of 90%. This is mainly due to the lower temperature of the chemical purifier, always slightly fouled with very fine soot which acts as a decomposition catalyst.

There is also observed a considerable reduction in the concentration of sulphuric aerosol contained in the boiler flue gases.

On the other hand, the purification of the sulfur dioxide is almost quantitative, but it may very easily be complete by mere variation of the operation of the installation.

Furthermore, it is possible to obtain sulphuric acid of commercial concentration and quality (60° Baume) directly after filtration.

What I claim is:

1. A method of purification of industrial flue gases and gaseous combustion effluents before their injection to the atmosphere said gaseous effluents containing as impurities especially sulfur dioxide and also oxides of nitrogen, sulphuric acid aerosols and soot, said method comprising essentially the steps of:

saturating said gaseous effluent with water vapor;
extracting the dust from said gaseous effluent;
purifying said gaseous effluent by establishing intimate contact between said gaseous effluent and an aqueous solution of hydrogen peroxide at a temperature of 55°–65°C. to produce sulfuric acid; and
concentrating said sulfuric acid by effecting direct contact between said gaseous effluent in the hot state at 135°–150°C and said liquid sulphuric acid.

2. A method of purification as claimed in claim 1, in which said hydrogen peroxide is introduced in the form of a very dilute cold aqueous solution into said gaseous effluent to be purified, said effluent being saturated with water.

3. A method of purification as claimed in claim 1, in which said gaseous fluid saturated with water is maintained very close to the point of saturation during said purification by partial and controlled cooling of the liquid phase.

4. A method of purification as claimed in claim 1, in which said saturation with water of said gaseous effluent is carried out immediately prior to said purification.

5. A method of purification as claimed in claim 1, in which the sulphuric acid formed during said chemical purification is subjected to a concentration by evaporation of water, the heat necessary for said evaporation being provided by the latent heat of the hot gaseous fluid, the contact between said gaseous fluid and the liquid being effected in counter-flow.

6. A method of purification as claimed in claim 1, in which said concentration follows said extraction and precedes said chemical purification, following the direction of circulation of said gaseous effluent.

7. A method of purification as claimed in claim 4, in which the quantity of water introduced as dilution is such as to provide, during the concentration, a cooling of said gaseous effluent to the temperature of said purification, the concentration of the sulphuric acid at the outlet of said concentration, and saturation of said gaseous effluent with water.

8. A method of purification as claimed in claim 1, in which said dust extraction is carried out so that the latent heat contained in said gaseous effluent is retained so as to permit the concentration of sulphuric acid in the next following phase.

9. A method of purification of hot industrial flue gases and gaseous combustion effluents before injection thereof to the atmosphere, said gaseous effluents containing as impurities sulfur oxide, oxides of nitrogen, sulfuric acid aerosols and soot, said method comprising:

extracting said soot from said hot gaseous effluent;
passing the hot gaseous effluent from which the soot has been removed countercurrent and in direct contact with a flow of cool, dilute sulfuric acid, said hot gaseous effluent being at a temperature of 135°–150°C, to concentrate said sulfuric acid and cool said effluent gas;
purifying said cooled gaseous effluent by establishing intimate contact between said gaseous effluent and a dilute aqueous solution of hydrogen peroxide at a temperature of 55°–65°C, and thereby producing said dilute sulfuric acid;
maintaining said gaseous effluent saturated with water vapor during said purification; and
injecting said purified gaseous effluent to the atmosphere.

10. A method in accordance with claim 9 wherein said gaseous effluent is maintained saturated with water vapor by maintaining a constant temperature close to the dew point during the step of cooling the hot gaseous effluent and concentrating the sulfuric acid.

11. A method in accordance with claim 9 wherein said gaseous effluent is maintained saturated with water vapor by spraying water into said gaseous effluent during said purifying.

12. A method in accordance with claim 9 wherein said gaseous effluent is maintained saturated with water vapor by injecting steam into said hot flue gases.

13. A method in accordance with claim 1 wherein said purifying is carried out by countercurrent flow between said cold dilute aqueous hydrogen peroxide and said cooled gaseous effluent.

* * * * *